United States Patent [19]

Nakayama

[11] Patent Number: 4,707,840

[45] Date of Patent: Nov. 17, 1987

[54] LINE EQUALIZER HAVING PULSE-WIDTH DEVIATION DETECTOR FOR COMPENSATING LONG-TERM LEVEL VARIATIONS

[75] Inventor: Kenji Nakayama, Tokyo, Japan

[73] Assignee: NEC Corporation, Tokyo, Japan

[21] Appl. No.: 927,036

[22] Filed: Nov. 5, 1986

[30] Foreign Application Priority Data

Nov. 5, 1985 [JP] Japan ............................ 60-246351

[51] Int. Cl.$^4$ ............................................. H04B 3/20
[52] U.S. Cl. .................................... 375/14; 330/279; 375/98; 379/410
[58] Field of Search ........................ 375/11, 12, 14, 22, 375/98; 370/32.1; 329/106; 328/111; 330/278, 279; 379/394, 398, 406, 409, 410, 411

[56] References Cited

U.S. PATENT DOCUMENTS 3,280,274 10/1966 Schoeffler ........................... 379/409
4,625,240 11/1986 Yablonski et al. .................. 375/9 B
4,652,703 3/1987 Lu et al. .............................. 379/410

Primary Examiner—Benedict V. Safourek
Attorney, Agent, or Firm—Sughrue, Mion, Zinn, Macpeak & Seas

[57] ABSTRACT

An adaptive line equalizer for a transmission line having a limited bandwidth comprises a frequency equalizer having a frequency response characteristic substantially inverse to the frequency response characteristic of the transmission line. A width deviation detector is provided for detecting the duration of an isolated pulse from the output of the frequency equalizer to generate a control signal representative of a deviation of the detected duration from a reference value. A variable gain amplifier is connected in series with the frequency equalizer for amplifying the pulse signal with a gain variable as a function of the control signal to compensate for long-term level variations.

7 Claims, 3 Drawing Figures

LINE EQUALIZER HAVING PULSE-WIDTH DEVIATION DETECTOR FOR COMPENSATING LONG-TERM LEVEL VARIATIONS

BACKGROUND OF THE INVENTION

The present invention relates to an adaptive line equalizer for correcting the distortions of digital siignals transmitted on a telephone subscriber loop.

Switched capacitor technology is known to implement an adaptive equalizer to meet the characteristics of transmission mediums of various line lengths. The gain of the equalizer at the Nyquist frequency (which is one-half of the maximum bit rate) is reduced when the peak value of the output of the equalizer exceeds a reference voltage and is raised when it drops below the reference voltage.

Since the equalizer is individually designed to equalize the transmission characteristics of a particular line length at the Nyquist frequency, there is a fixed relationship between the line length and the equalization characteristics. However, a drift in the transmission gain of the equalizer or a temperature-dependent line loss variation cause a long-term level variation to occur and destroy such relationship. Furthermore, in telephone subscriber loop applications, the bridged-tap connections are potential sources of echoes which necessitate the provision of a decision feedback restoration technique to eliminate intersymbol interference caused by the echoes.

SUMMARY OF THE INVENTION

The present invention is based on the recognition that the long-term level variation causes a change in pulse width as well as a change in droop (intersymbol interference). Specifically, a positive-going long-term variation results in an underequalization of the frequency response characteristic of the transmission line, causing the pulse duration to increase with an accompanying small droop. On the other hand, a negative-going long-term variation results in an overequalization of the transmission line characteristic, causing the pulse duration to decrease with an accompanying large droop. In telephone subscriber loop applications, bridged tap connections are potential sources of echoes which increase the intersymbol interference. The provision of a bridged-tap equalizer has therefore been required to eliminate such intersymbol interference. Thus, the bridged-tap attributed droop cannot serve as a decision threshold for the determination of whether the transmission line characteristic is underequalized or overequalized.

The present invention is therfore based on the utilization of the pulse width deviation as a decision thereshold for the determination of a long-term level variation in order to automatically adjust the gain of the equalizer.

Specifically, the adaptive line equalizer of the present invention is intended for use in a transmission line having a limited bandwidth. The line equalizer comprises a frequency equalizer having a frequency response characteristic substantially inverse to the frequency response characteristic of the transmission line. A width deviation detector is provided for detecting the duration of an isolated pulse from the output of the frequency equalizer to generate a control signal representative of a deviation of the detected duration from a reference value. A variable gain amplifier is connected in series with the frequency equalizer for amplifying the pulse signal with a gain variable as a function of the control signal.

BRIEF DESCRIPTION OF THE DRAWINGS

The present invention will be described in further detail with reference to the accompanying drawings, in which.

DETAILED DESCRIPTION

Figure 1:
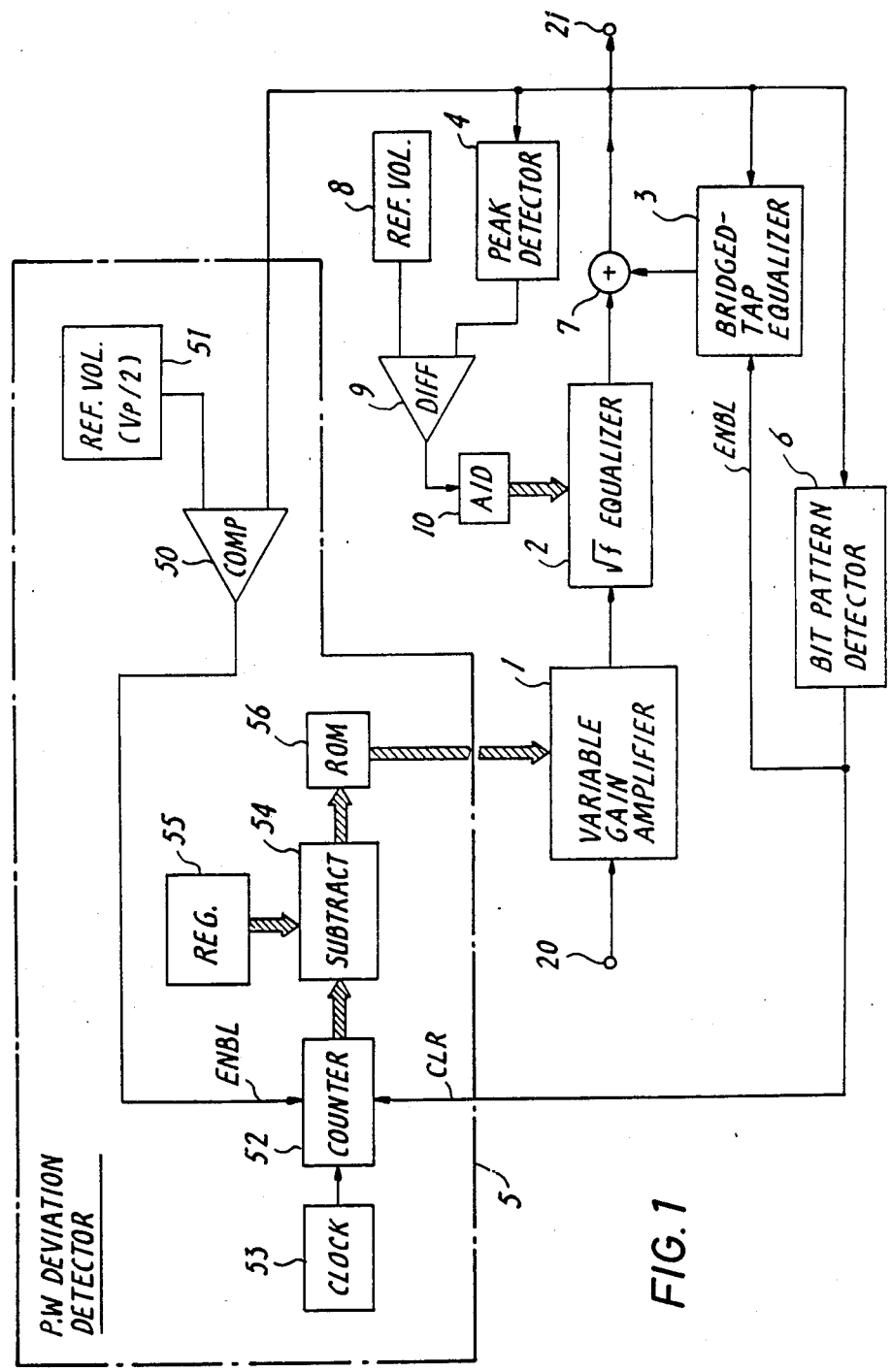
FIG. 1 is a block diagram of a preferred embodiment of a line equalizer of the present invention.

In FIG. 1, there is shown a preferred embodiment of an adaptive line equalizer of the present invention. An input signal to be equalized, such as bipolar pulse signal, is applied through an input terminal 20 to a variable gain amplifier 1 and a $\sqrt{f}$ equalizer 2 which are connected in series to a first input of an adder 7 where the equalized signal is combined with a "droop" compensation voltage from a decision feedback bridged-tap equalizer 3, which is connected to the output of adder 7, to eliminate a "droop" (intersymbol interference) due to a long-term level variation as well as echoes returning from bridged taps of the subscriber line. The equalized pulse signal is delivered from adder 7 to an output terminal 21. Details of the bridged-tap equalizer are described in "Line Equalizer for a Digital Subscriber Loop Employing Switched Capacitor Technology", T. Suzuki et al, IEEE Transactions, Vol. COM-30, No. 9, Sept. 1982.

On the other hand, the well-known frequency response characteristic of the subscriber line is equalized by the equalizer 2. A peak detector 4 has an input from the output of adder 4 to detect the peak value of the equalized output signal at terminal 21. A differential amplifier 9 compares the detected peak value with a reference voltage which is supplied from a reference source 8 as a representation of an optimum output level of the adaptive equalizer and generates a difference signal, which is converted to a digital signal by an analog-to-digital converter 10. This digital signal controls a switched-capacitor circuit of the frequency equalizer 2 so that the deviation of the output signal from the optimum level due to a short-term level variation is compensated.

The equalized output signal is further applied to a bit pattern detector 6. This detector has a predetermined bit pattern, typically "0100", to generate an output when an isolated pulse is received. In response to the output of bit pattern detector 6, the bridged-tap equalizer 3 is enabled to provide threshold decision according to the output of the adder 7 and supply a feedback restoration voltage to the second input of adder 7 to eliminate the droop.

The equalized output is further applied to a pulse-width deviation detector 5 which includes a comparator 50 that compares the instantaneous amplitude value of the equalized signal with a reference voltage from a voltage source 51 which is equal to one-half of a standard peak value Vp of the bipolar pulse. Comparator 50 produces an output which lasts as long as the equalized signal is higher than the reference voltage Vp/2, this output being applied to a counter 52 to enable it to initiate counting clock pulses from a clock source 53.

The clock pulse has a frequency 2·m·fn (where fn is the available bandwidth, or Nyquist frequency of the subcriber line and m is an integer equal to or greater than unity) which corresponds to an integral multiple of the maximum transmission rate. The integer m is determined in accordance with the degree of precision required. The output of counter 52 is a binary representation of the width of a pulse of an input data bit stream. This binary count is compared by a subtractor 54 with a reference count from a register 55 which represents a standard pulse duration at one-half of the standard pulse amplitude. The output of subtractor 54 thus represents the amount and direction of a deviation from the standard pulse duration. A read-only memory 56 is connected to the output of subtractor 54 to convert the pulse width deviation into a set of binary control signals. The control signals are applied to the variable gain amplifier 1 so that if there is a long-term level variation in the transmission line the gain of the adaptive equalizer is automatically adjusted to compensate for such variation. The counter 52 is thereafter cleared by the bit pattern detector 6 in preparation for the next operation.

Figures 2, 2A:
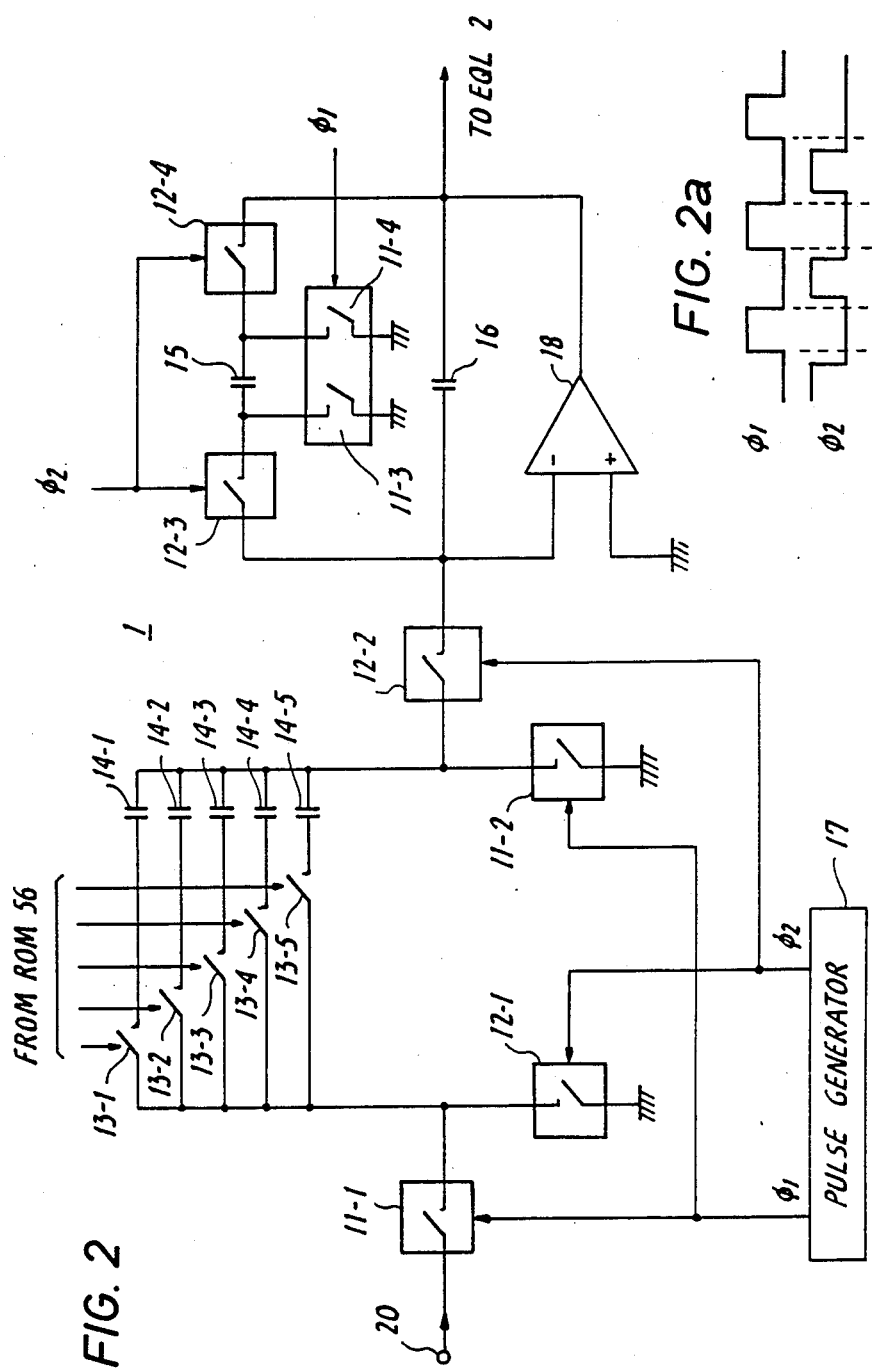
FIG. 2 is a circuit diagram of the variable gain amplifier of FIG. 1.
FIG. 2a is an illustration of waveforms of the sampling pulses generated by the pulse generator of FIG. 2.

As shown in FIG. 2, the variable gain amplifier 1 includes a switched-capacitor circuit formed by a set of switches 13-1 through 13-5 and a set of corresponding capacitors 14-1 through 14-5 which are connected in parallel between sample switches 11-1 and 11-2 to charge capacitors 14 with an input pulse at terminal 20 when switches 11-1 and 11-2 are activated in response to a phase-1 sampling pulse (FIG. 2a) from a sampling pulse generator 17. Switches 12-1 and 12-2 are activated in response to a phase-2 sampling pulse from the pulse generator 17 to provide a path for discharging the capacitors 14 into the inverting input of an operational amplifier 18 whose noninverting input is connected to ground. The output of amplifier 18 is connected to its inverting input by a feedback circuit which comprises a capacitors 15 and 16. Capacitor 15 is connected to the capacitor 16 in parallel relationship when switches 12-3 and 12-4 are activated during a phase-2 mode. During a phase-1 mode of operation, switches 11-3 and 11-4 are activated to discharge the capacitor 15.

Switches 13-1 through 13-5 are controlled respectively by output lines of the ROM 56 to connect the capacitors 14-1 through 14-5 in accordance with the pulse width deviation detected by the subtractor 54 so that the long-term level variation of the transmission line is compensated.

Since the pulse duration of an isolated pulse is primarily determined by the amount of overequalization or underequalization of the $\sqrt{f}$ transmission characteristic of the subscriber line by the equalizer 2, the deviation of the characteristic of frequency equalizer 2 from the ideal characteristic of a particular subscriber line due to an erratic level variation is compensated.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An adaptive line equalizer for a transmission line having a limited bandwidth, comprising:
   frequency equalizer means having a frequency response characteristic substantially inverse to the frequency response characteristic of said transmission line for equalizing a pulse signal;
   deviation detector means for detecting the duration of a pulse in said equalized pulse signal and detecting a deviation of said detected duration from a reference value; and
   variable gain amplifier means connected in series with said frequency equalizer means for amplifying said pulse signal with a gain variable as a function of said detected deviation.

2. An adaptive line equalizer as claimed in claim 1, wherein said transmission line includes a bridged tap connection, further comprising:
   decision feedback restoration means connected to said frequency equalizer means for reducing a droop caused by a long-term level variation and echoes returning from said bridged tap connection.

3. An adaptive line equalizer for a telephone subscriber loop having a bridged tap connection, comprising:
   frequency equalizer means having a frequency response characteristic substantially inverse to the frequency response characteristic of said subscriber loop for equalizing a pulse signal;
   deviation detector means for detecting the duration of a pulse in said equalized pulse signal and detecting a deviation of said detected duration from a reference value;
   variable gain amplifier means connected in series with said frequency equalizer means for amplifying said pulse signal with a gain variable as a function of said detected deviation; and
   decision feedback restoration means connected to said frequency equalizer means for reducing a droop caused by a long-term level variation and echoes returning from said bridged tap connection.

4. An adaptive line equalizer as claimed in claim 3, further comprising a bit pattern detector connected to the output of said frequency equalizer means for detecting when the equalized pulse signal has a predetermined bit pattern indicative of the presence of an isolated pulse, and wherein said decision feedback restoration means is enabled in response to the detection of said predetermined bit pattern.

5. An adaptive line equalizer as claimed in claim 4, wherein deviation detector means comprises:
   counter means for periodically incrementing a count value, said counter means being cleared in response to the detection of said predetermined bit pattern;
   means for enabling said counter means for a period during which the amplitude of said equalized pulse signal is higher than a predetermined pulse amplitude, so that the incremented count value represents the duration of a pulse of said equalized pulse signal; and
   means for detecting a difference between said incremented count value and a reference count value indicative of a reference pulse duration and controlling said variable gain amplifier means with said difference.

6. An adaptive line equalizer as claimed in claim 5, wherein said counter means is incremented at a frequency equal to or greater than twice the available bandwidth of said subscriber loop.

7. An adaptive line equalizer as claimed in claim 3, further comprising means for eliminating a short-term level variation of said equalized pulse signal.

* * * * *